United States Patent [19]
Norris

[11] 3,977,014
[45] Aug. 24, 1976

[54] FOLLOW FOCUS EXPOSURE CONTROL SYSTEM WITH IMPROVED UNIFORM TRIM CONTROL

[75] Inventor: Philip R. Norris, North Reading, Mass.

[73] Assignee: Polaroid Corporation, Cambridge, Mass.

[22] Filed: Mar. 3, 1975

[21] Appl. No.: 554,771

[52] U.S. Cl. .................................. 354/196; 354/29; 354/271
[51] Int. Cl.² ...................... G03B 9/02; G03B 9/24
[58] Field of Search ........... 354/149, 139, 196, 278, 354/230, 271, 272, 32, 42, 29, 30, 59

[56] References Cited
UNITED STATES PATENTS

| | | | |
|---|---|---|---|
| 3,478,660 | 11/1969 | Land ............................... | 354/196 X |
| 3,641,891 | 2/1972 | Burgarella ....................... | 354/30 X |
| 3,750,543 | 8/1973 | Eloranta et al. .................. | 354/29 X |
| 3,832,722 | 8/1974 | Douglas .......................... | 354/196 X |

*Primary Examiner*—L. T. Hix
*Assistant Examiner*—E. M. O'Connor
*Attorney, Agent, or Firm*—Edward S. Roman

[57] ABSTRACT

An exposure control apparatus is provided for a photographic camera of the type suitable for use with a source of artificial illumination and includes a follow focus system for determining a maximum exposure aperture in correspondence with lens focusing as a direct function of camera to subject distance. The maximum exposure aperture is determined by the position of an interceptor which is rotated about a select pivot point by the coaction of a cam follower engaged by a cam surface. The cam surface moves in concert with lens focusing in a manner whereby a predetermined number of degrees rotation of the interceptor about the select pivot point corresponds to a predetermined number of F stop changes in the determined maximum exposure aperture. There may also be included means for selectively trimming the determined maximum aperture size defining position of the interceptor by rotating the interceptor about its select pivot point without displacing the cam follower along its associated cam surface.

20 Claims, 7 Drawing Figures

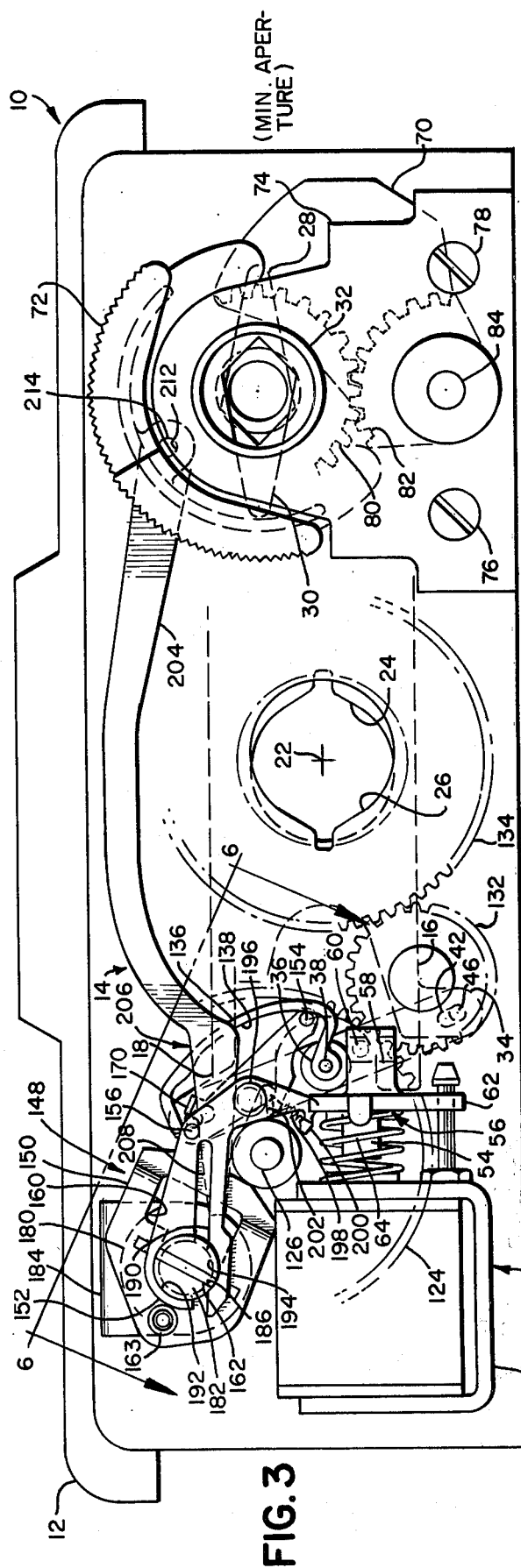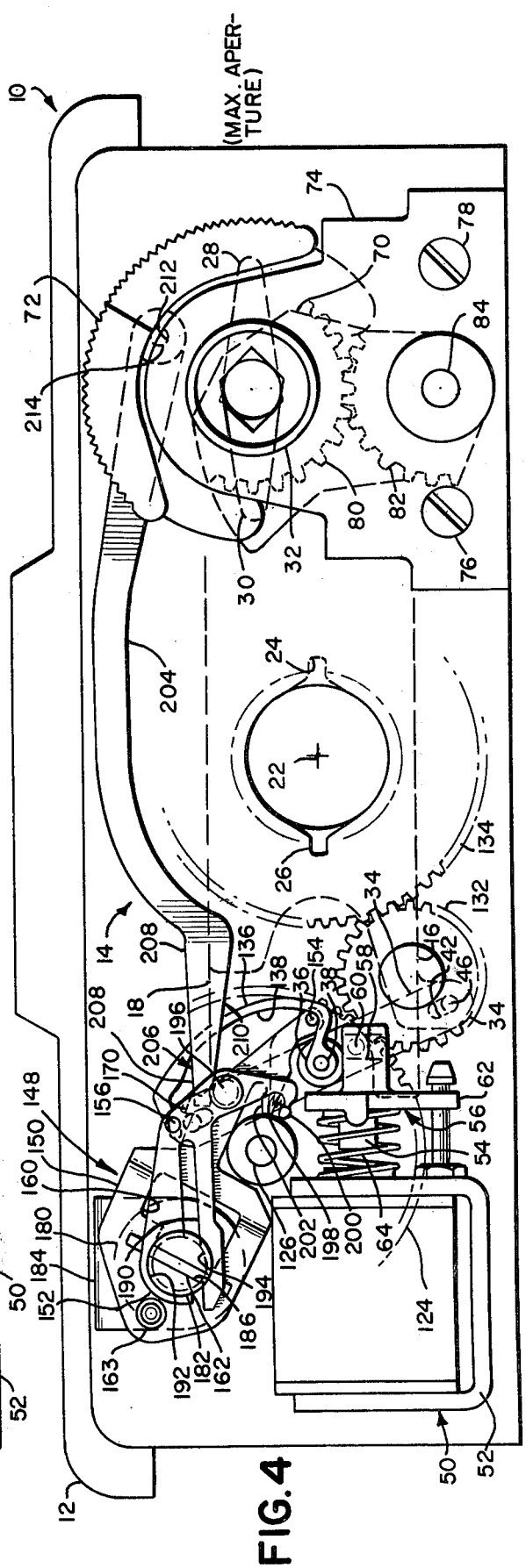

FOLLOW FOCUS EXPOSURE CONTROL SYSTEM WITH IMPROVED UNIFORM TRIM CONTROL

BACKGROUND OF THE INVENTION

1. Field of the Invention

This invention relates generally to exposure control apparatus for a photographic camera and more particularly to exposure control apparatus for a photographic camera wherein the exposure control apparatus embodies a follow-focus capability in combination with a selectively operable trimming capability both of which may be operated entirely independent of each other.

2. Description of the Prior Art

When operated in conjunction with flash or transient illumination, the exposure mechanism of a photographic camera usually is adjusted in accordance with the levels of illumination anticipated at a scene being photographed. To anticipate these levels, an evaluation is made based upon an application of the inverse square law of light energy propagation. Under this law, the light energy available from a given source is considered to vary inversely with the square of the distance from that source. Accordingly, to make an appropriate exposure mechanism adjustment for flash photography, light source-to-subject distance is derived and the value of this distance is utilized to compute an appropriate exposure value or illuminational factor.

In some camera designs, exposure control adjustment for flash operation is effected automatically by incorporating within the apparatus what is termed as a "follow-focus" system. With a follow-focus arrangement, aperture adjustment or flash illumination output control is mechanically coupled with the range finding or focusing system of a camera. In effect, a follow-focus control represents a second exposure control system for a camera. As such, its presence necessarily contributes to the size and complexity of a camera.

Where aperture is adjusted as a follow-focus procedure, the exposure control housing of a camera must incorporate one aperture adjustment mechanism for daylight regulation as well as another control system which is operative exclusively for flash illuminated exposures and which does not otherwise interfere with the daylight exposure regulating system. Providing such dual regulating systems within a fully automated camera and, particularly, a camera which is of such thin and compact design as to be conveniently carried within a pocket of a garment poses complex design considerations.

In one fully automated but thin and compact camera described in U.S. Pat. No. 3,714,879, an exposure control system is described wherein both aperture and exposure interval are automatically varied in accordance with scene lighting conditions. This exposure control system operates in conjunction with a single lens reflex viewing system as well as with a motorized form of automatic film processing. Exposure regulation within the thin, fully automated but compact camera takes place as part of a multi-step program involving the conversion of an optical path between viewing and exposure operational modes.

The shutter-aperture components of the exposure mechanism of the noted reflex camera are normally open for viewing and focusing and are energized to close the taking aperture both for operational mode conversion as well as for terminating exposure interval. An optimized automatic weighting of aperture and exposure interval in accordance with a predetermined program is derived with the control system through the use of a progressively varying aperture movement during any given exposure interval.

A follow-focus control technique for such an exposure control system is described in U.S. Patent entitled, "Focus Responsive Exposure Control System", by Vaito K. Eloranta and Edwin K. Shenk, U.S. Pat. No. 3,750,543, issued Aug. 7, 1973, and assigned in common herewith. The latter application described a second flash mode control system wherein an electromagnetic device such as a solenoid is selectively maneuvered and energized to extend its plunger and arrest the position of exposure aperture blades in accordance with focal setting.

Complete follow focus systems are described in a U.S. Patent entitled, "Apparatus and System for Flash Photography" by Lawrence M. Douglas, issued Aug. 27, 1974, U.S. Pat. No. 3,832,722, assigned in common herewith and an application for U.S. Pat. Ser. No. 534,733 entitled "Exposure Control System for Photographic Apparatus" by Lawrence M. Douglas filed Dec. 19, 1974, assigned in common herewith. These follow focus systems achieve the necessary compactness to meet the overall camera design of the above described variety so as to incorporate both exposure control features within a very compact and thin exposure housing. The above follow focus systems additionally provide a "trim" function to accommodate for slight variations in the sensitometric characteristics of the film as well as to insert a modicum of personal or overriding control over the automated system. Trim controls of this type also incorporate only one control element for operation in a manner reducing the possibility that a camera operator may become confused or overlook a requirement for providing a trim control for that mode of operation which he is currently using. Such trim controls have generally embodied a cam surface movable in correspondence with lens focusing and drivably engagable to a cam follower the position of which directly determines the maximum allowable aperture size. The trim function can be introduced by driving the cam follower along its associated cam surface when the cam surface remains stationary subsequent to camera focusing in this manner trimming the maximum allowable aperture size. Whereas systems of this type perform satisfactorily, it is now suggested by way of the instant invention that improved trim control may be achieved if the trim function is entirely divorced from its dependence upon the cam follower position along its associated cam surface.

It is therefore a primary function of this invention to provide an improved follow focus system of the above described type embodying an improved trim control.

It is a further object of this invention to provide an improved follow focus system of the type embodying a cam follower drivable in correspondence with lens focusing for determining a maximum aperture opening together with a trim control function for changing the determined maximum aperture opening by a uniform amount without moving the cam follower.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

The invention now presented relates to an exposure apparatus for a camera of the type defining a film plane and including a housing and an objective lens mounted on the housing. The exposure apparatus includes means for adjusting the objective lens to accommodate its focusing at the camera's film plane of images of scenes located at different distances from the camera. There are additionally included means for controlling the amount of scene light incident on the film plane wherein the scene light controlling means includes a blade assembly movable along a predetermined path to define a range of apertures through which the scene light must pass in reaching the film plane. Means responsive to the operation of the adjusting means are provided for determining a maximum aperture size from the range of aperture sizes whereby the determined maximum aperture size corresponds to the distance a particular scene being photographed is positioned from the camera. The maximum aperture size determining means include a cam surface coupled to the lens adjusting means to be displaced in correspondence with the operation of the lens adjusting means, a cam follower in contact with the cam surface, an interceptor selectively operable to restrain the movement of the blade assembly along the predetermined path together with means for coupling the cam follower to the interceptor. The coupling means are disposed for rotation about a fixed pivot point which is spaced apart from the scene light controlling means and maintained in fixed relation relative to the objective lens. Thus, displacement of the cam surface in correspondence with objective lens focusing operates to effect a displacement of the cam follower in a manner resulting in rotation of the coupling means and its associated interceptor about the select pivot point in order to change the determined maximum aperture size. Drive means which are selectively operable are provided for moving the interceptor into the predetermined path of the blade assembly in order to restrain the movement of the blade assembly at the determined maximum aperture size-defining position. In addition, there may also be included means for selectively trimming the determined maximum aperture size-defining position of the interceptor by pivoting the interceptor about the select pivot point in a manner imposing an arcuate displacement to the interceptor entirely independent of the adjusting means and solely dependent on the operation of the trimming means.

BRIEF DESCRIPTION OF THE DRAWINGS

The novel features that are considered characteristic of the invention are set forth with particularity in the appended claims. The invention itself, however, both as to its organization and its method of operation, together with other objects and advantages thereof, will best be understood from the following description of the illustrated embodiment when read in conjunction with the accompanying drawings wherein like numbers have been employed in the different figures to denote the same parts and wherein.

FIG. 3 is a front sectional view of the exposure control mechanism of FIG. 1 in another mode of operation.

FIG. 4 is a front sectional view of the exposure control mechanism of FIG. 1 in still another mode of operation.

DESCRIPTION OF THE PREFERRED EMBODIMENT

To derive adequate lighting for purposes of viewing and focusing, the exposure control arrangement maintains a full aperture opening and open shutter until a photographic cycle is commenced. When a camera is actuated to start such a cycle, the shutter is fully closed to secure its exposure chamber while the reflex arrangement is moved into its exposure orientation uncovering the exposure plane. Following this maneuver, an exposure is made after which the shutter is again held fully closed while the reflex assembly is returned to its initial viewing mode orientation. As this orientation is again reached, maximum aperture width is reestablished and the shutter is opened to provide for viewing and focusing in preparation for a subsequent photographic cycle.

A reflex photographic camera having components operating under the above cataloged program is described in detail in U.S. Pat. No. 3,672,281. The camera structure described therein particularly is notable for its thin and compact structure, suiting it to be conveniently carried in the pocket of a garment.

The exposure system preferred for incorporation in this camera is one which also is ideally suited to be confined within an exposure housing of restricted dimension in keeping with the compact structure of the camera. Described in detail in U.S. Pat. No. 3,641,889, the exposure regulating system is formed as a two-bladed shutter-aperture mechanism which is driven between relaxed and energized conditions for selectively blocking light along the optical path of a camera. The noted exposure mechanism also provides for automatic exposure control utilizing a light sensitive network and solenoid actuated drive which combine to provide a programmed weighting of aperture and exposure interval for that range of scene brightness most commonly encountered in conventional photographic practice.

Figure 1:
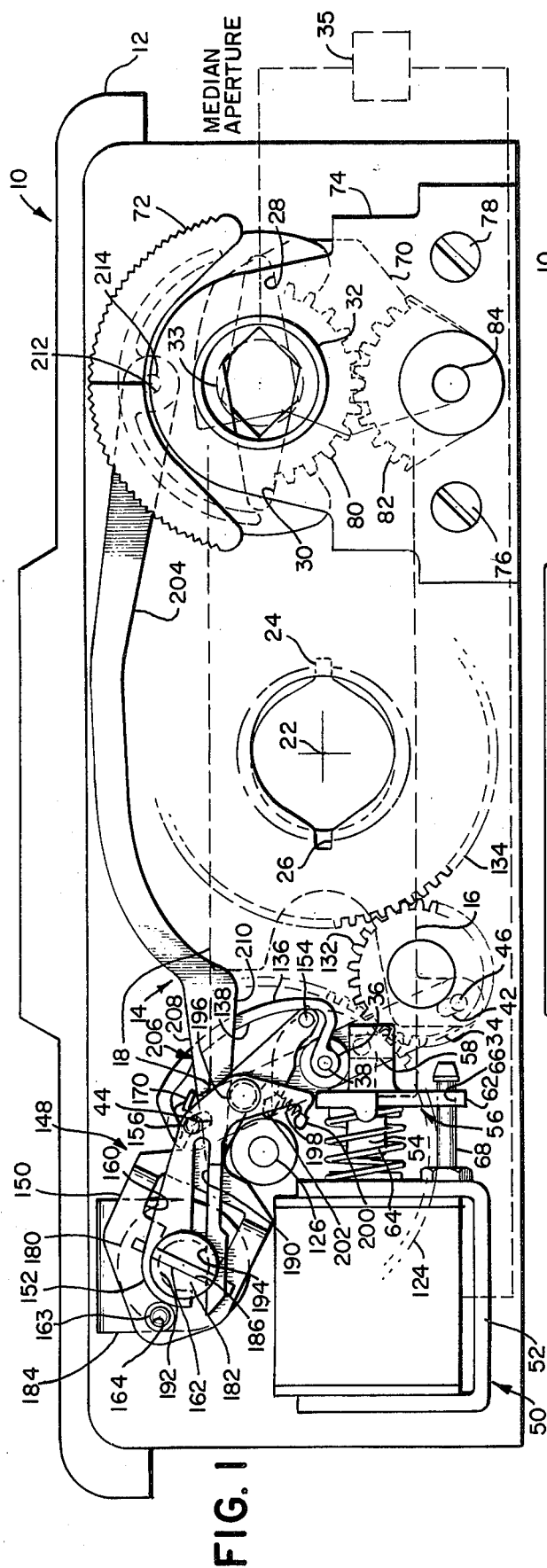
FIG. 1 is a front sectional view of an exposure control mechanism according to the invention.
Figure 5:
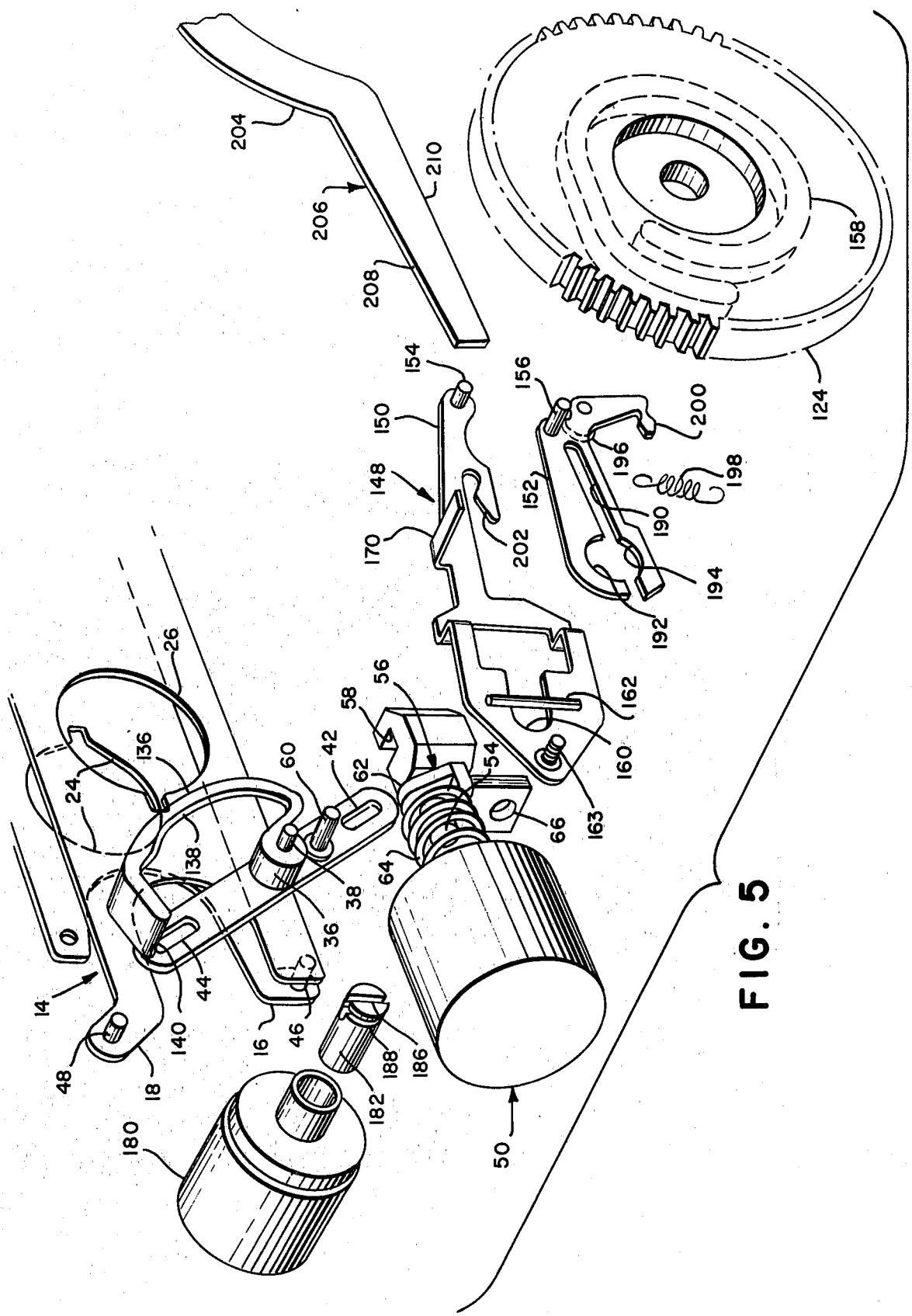
FIG. 5 is an exploded perspective view of a portion of the exposure control housing of FIG. 1.

Referring to FIG. 1, the basic components of this shutter-aperture mechanism are revealed in detail as they are present within a compact exposure housing 10 of relatively thin front-to-back dimension. Mounted upon a rear baseblock 12, the exposure mechanism, shown generally at 14, is formed having two cooperatively moving shutter-aperture blades 16 and 18. Blades 16 and 18 slide horizontally within a mount (not shown) forming part of the lens housing 20 of an optical objective 22 defining the entrance of the optical path of the camera. Referring additionally to FIG. 5, each of the blades, 16 and 18, is formed having a selectively shaped aperture opening, respectively depicted at 24 and 26, movable across the optical path of the camera at 22. Depending upon the position of blades 16 and 18, aperture openings 24 and 26 symmetrically overlap over the optical path to define selectively varying aperture sizes. Each blade, 16 and 18, additionally is configured having a selectively configured and corresponding photocell sweep opening, respectively depicted at 28 and 30. Openings 28 and 30 are configured in correspondence with the contours of respective aperture openings 24 and 26. The openings 28 and 30 may move with mutual symmetry over the optical path of a small entrance lens 32 providing for the passage of light from the scene being photographed to a photosensing element 33 of a light sensitive control circuit 35.

Blades 16 and 18 define a continuous progression of apertures over the optical path at 22 as a result of their mutual connection with a walking beam as shown at 34. Walking beam 34 is formed having a centrally disposed hub portion 36 which extends laterally out of the walking beam and is journaled for rotation about an upstanding stud 38 fixed within and extending from rear casting 12. Elongate slots, 42 and 44, are formed in the outward tip of portion of beam 34 for the purpose of providing connection with pins 46 and 48 extending, respectively, from blades 16 and 18.

Thus interconnected, the blades 16 and 18 move simultaneously and in correspondence with each other to define a continuous progression of symmetrically configured variable aperture openings over the camera optical path at 22 as well as over the photocell light path at 32. Elongate slots 42 and 44 serve the function of accommodating the horizontally restricted movement of blades 16 and 18 along a cord through the locus of rotation of the tips of beam 34.

Movement of blades 16 and 18 from their open orientation into a closed orientation blocking the passage of light along the optical path of the camera 22 is carried out by an electromagnetic device operative to provide a driven mode of operation. This electromagnetic drive is present as a solenoid 50 mounted upon rear casting 12 by a bracket 52. Solenoid 50 is of somewhat conventional design, having an internally disposed cylindrical plunger 54 which retracts inwardly into its spiral winding and associated casing upon energization thereof. when solenoid 50 is so energized, walking beam 34 is rotated rapidly to move blades 16 and 18 into the closed orientation shown in FIG. 2. The cylindrical plunger 54 includes a connector member 56 at the outward end thereof which connector member includes a vertical slotted portion 58 slidably engaged by a pin 60 which extends laterally outward from the walking beam 54. Connector member 56 additionally includes an overlapping flanged portion 62 which engages the moving end of a compression spring 64 around the cylindrical plunger 54. The overlapping flange portion 62 additionally includes a horizontal bore therethrough as shown at 66 which bore translatably engages a longitudinal guide member 68 extending outward from the solenoid bracket 52. The guide member 68 thus cooperates with the overlapping flange portions 62 of the connector member 56 to inhibit the cylindrical plunger 54 from rotating about its longitudinal axis upon solenoid actuation.

Compression spring 64 operates to bias walking beam 34 for rotation in a manner wherein aperture openings 24 and 26 of respective blades 16 and 18 define a relative aperture of maximum dimension over the optical path at 22. This bias results from the fact that the stationary end of compression spring 64 abuts against the solenoid bracket 52 while the moving end of the spring abuts against the connector member at the outward tip of the plunger 54.

Figure 2:
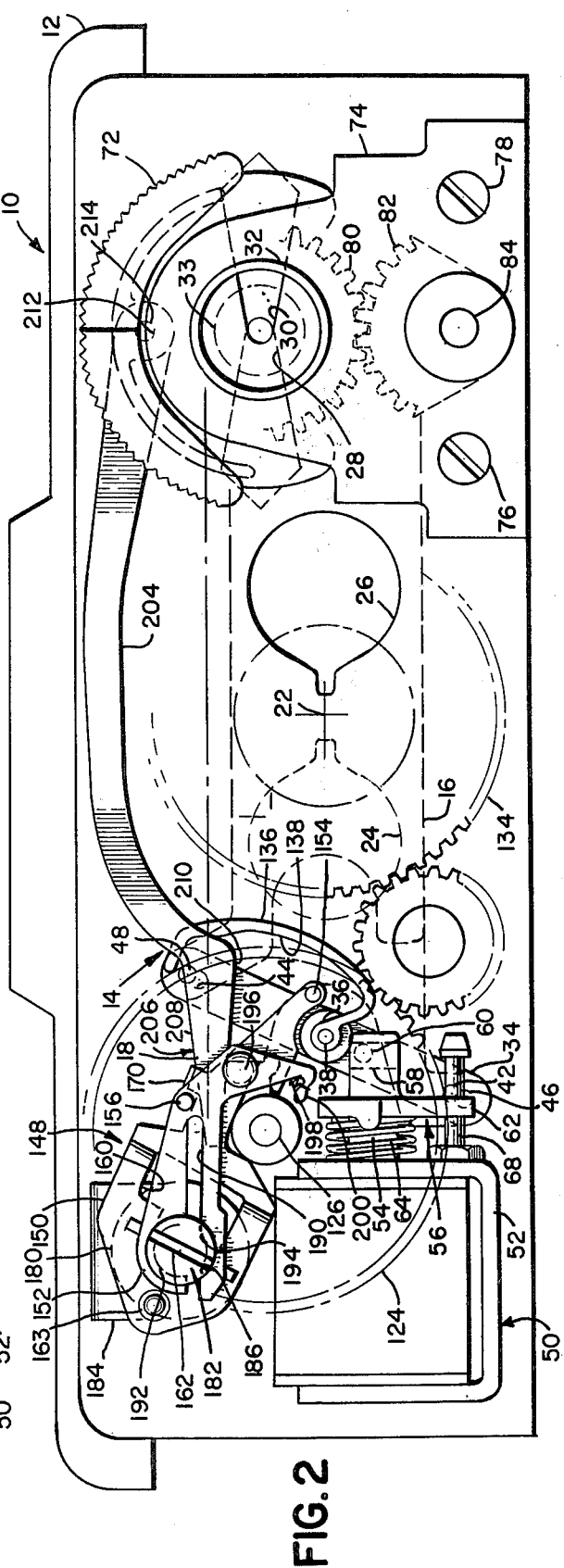
FIG. 2 is a front sectional view of the exposure control system of FIG. 1 in a different mode of operation.

Following conversion of an associated reflex camera to an exposure configuration, an exposure interval commences with the deenergization of solenoid 50 following its energization to fully close shutter aperture blades 16 and 18 as depicted in FIG. 2. With this deenergization, compression spring 64 operates to move blades 16 and 18 in a manner progressively enlarging the aperture over the optical path 22. Simultaneously, photocell sweep openings 28 and 30 define a corresponding progressively enlarging aperture opening over the photocell opening at 32.

When an appropriate amount of light is received through window 32 to trigger the control circuit, 35 solenoid 50 is again energized to rapidly close blades 16 and 18, thereby terminating an exposure interval. The latter energization of solenoid 50 continues until such a time as the reflex camera has assumed its viewing and focusing mode orientation.

With the ambient operation thus described, relative aperture as well as exposure interval are selectively weighted for any given level of scene brightness so as to optimize the selection of exposure interval and aperture. To trim this ambient performance of the exposure system, an optical wedge 70, having selectively variable transmissive properties, is pivotally manipulated before the photocell positioned rearwardly of lens 32. Adjustment of the position of wedge 70 may be carried out by manually rotating a semi-circular trim wheel 72 from its uppermost serrated edge. Trim wheel 72 is rotatable about opening 32 by virtue of its journaled connection with a mounting plate 74 which plate is attached to the rear casting 12 by screws as at 76 nd 78. The lowermost portion of trim wheel 72 is formed having a gear segment 80 which is meshed with a corresponding gear segment 82 formed within the lower portion of optical wedge 70. Wedge 70 is pivotally mounted within the assembly upon a stud 84 extending from rear casting 12. Accordingly, rotation of trim wheel 72, in turn, selectively drives optical wedge 70 from its gear segment 82 through gear segment 80.

Manipulation of trim wheel 72 will selectively move optical wedge 70 across lens opening 32 to adjust the amount of light permitted to enter the light sensing network through cell sweep openings 28 and 30. A given orientation for the assembly is depicted in FIG. 1. Appropriate indicia may be positioned upon the housing 10 to aid the camera operator in inserting an appropriate amount of trim or exposure value adjustment.

Figure 7:
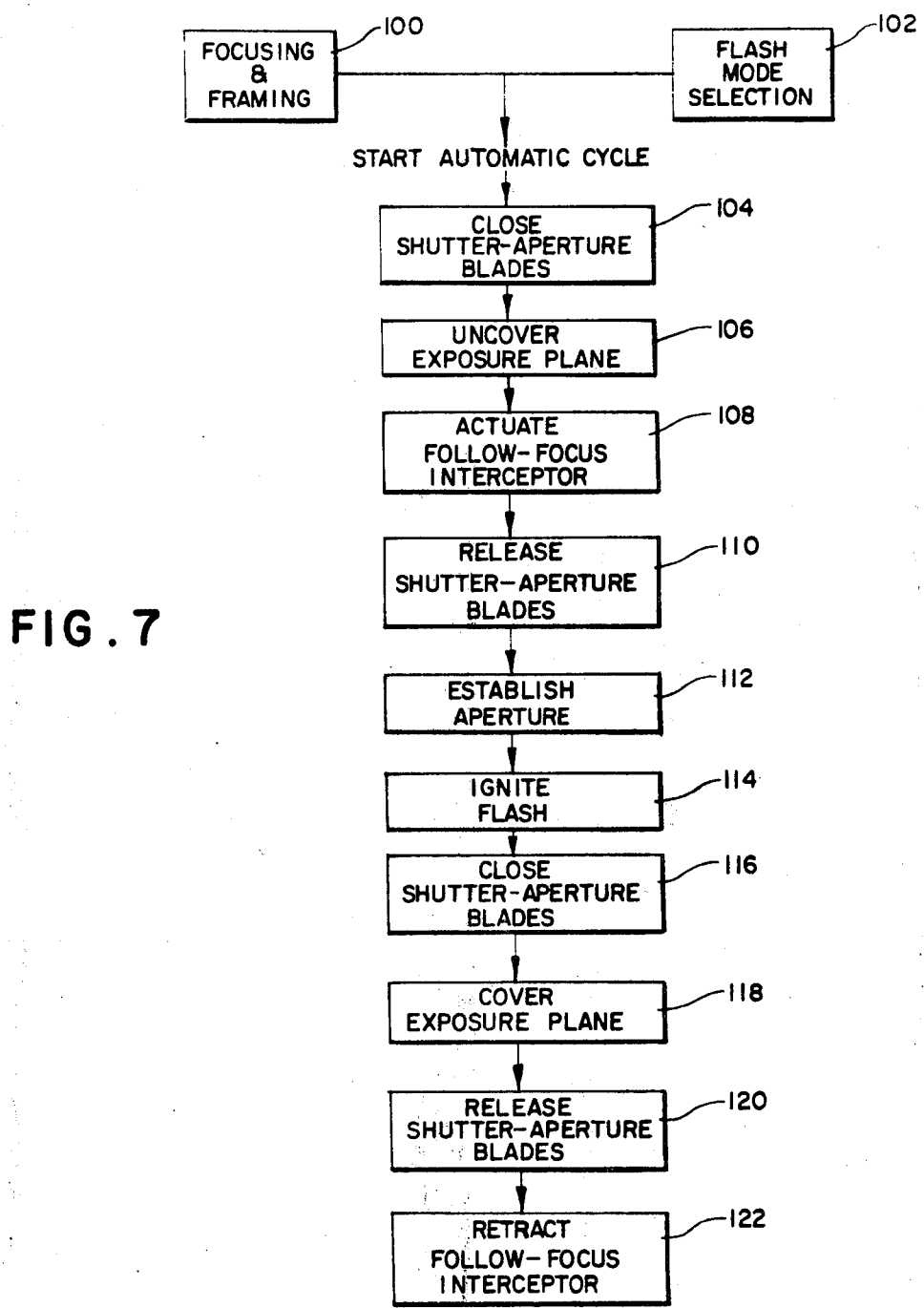
FIG. 7 is a diagrammatic view illustrating the mode of operation for the exposure control system of FIG. 1.

Referring to FIG. 7, the sequence of operational events occurring during flash performance of a reflex camera incorporating the subject exposure system is dipicted. For instance, following focusing and framing as depicted at block 100 as well as conversion of the camera to flash mode performance as indicated at 102, an automatic cycle is commenced with the depression of a start button or the like. Pressing the start button causes the shutter aperture blades 16-18 to close as depicted at 104. The blades 16 and 18 are held closed at least until the exposure plane of the camera is fully uncovered as indicated at 106. Following the uncovering of the exposure plane as at 106 and while the shutter-aperture blades 16–18 remain closed, a follow-focus interceptor function is actuated as depicted at 108. Solenoid 50 is then de-energized to release the shutter-aperture blades 16–18 as depicted at 110. Blades 16 and 18 are driven by spring 64 to progressively open the aperture over the optical path at 22 until they are intercepted to establish an aperture as indicated at 112. Once aperture is established, a flashlamp or strobe is ignited as depicted at 114, following which solenoid 50 is again energized to close the shutter-aperture blades 16-18 as indicated at 116. While blades 16 and 18 remain closed, the exposure plane of the camera is again covered as depicted at 118, following which solenoid 50 is again de-energized to release shutter-aperture blades 16-18 for movement to define a maximum aperture width as depicted at 120. Prior to the foregoing release 120, the interceptor function is retracted from the path of blades of 16 and 18 as shown at 122.

The follow-focus interceptor functionally described in connection with blocks 108 and 122 operates in conjunction with the focusing components of the camera. Referring to FIGS. 1 and 5, a manually rotatable focus wheel 124 is shown mounted upon a pivot pin 126 which connects to the rear casting 12. Focus wheel 124 is formed having peripherally disposed gear teeth. These teeth are meshed with the teeth of an idler gear 132 which, in turn, is in driving connection with the external gear teeth of a cylindrical bezel assembly 134 retaining optical objective 22. A detailed description of assembly 134 is set forth in a copending application for United States Patent by Rosario J. Messina entitled, "Adjustable Lens Mounting", filed Dec. 28, 1970, Ser. No. 101,745, and assigned in common herewith (now abandoned). Bezel 134 is rotatable from focus wheel 124 to provide objective lens focusing and, as may be apparent, the rotational orientation of focus wheel 124 continuously corresponds with the focus setting of the lens system.

Looking additionally to FIGS. 2-5, walking beam 34 is formed supporting a longitudinal cam member 136, one edge of which defines a cam surface as shown generally at 138. Cam member 136 connects at one end to the hub portion 36 of walking beam 34 with the opposite end of the cam member being connected to the walking beam 34 through a laterally extending integral pin member 140. Cam member 136 moves through a predetermined locus of travel as blades 16 and 18 are driven either under the bias of spring 64 or from the plunger 54 of solenoid 50. For follow focus operation the movement of walking beam 34 along its predetermined locus of travel establishing increasingly widening apertures is selectively arrested to establish a focus responsive determined maximum aperture size value. Motion arrest is provided generally by cam follower interceptor assembly 148 comprising an interceptor pivot arm 150 together with a follower pivot arm 152. Blade motion arrest is provided generally by the interceptor pivot arm 150 which includes an interceptor component or pin 154 extending laterally outward therefrom for selective positioning within the above noted locus of travel so as to contact the cam edge surface 138 of cam member 136 to halt the exposure mechanism as it moves under the bias of compression spring 64.

Cam follower interceptor assembly 148 is operatively associated with the rotational orientation of focus wheel 124. This association is provided by the radial connection to a follower pin 156 extending laterally outward of the follower pivot arm 152 and slidably driven in positive fashion by a face-groove cam 158 formed within the backward face of focus wheel 124.

Referring to FIGS. 1 and 5, an arrangement for enabling or actuating the follow focus system, and more particularly, interceptor pin 154 is disclosed in more detail. Actuation of the follow focus interceptor is provided by select energization of an electromagnetic drive comprising a solenoid 180 having spring-loaded plunger 182 which is retractable within the solenoid 180 upon energization thereof. Solenoid 180 is mounted in stationary fashion with respect to rear baseblock 12 by a bracket 184. The spring loaded plunger 182 is diametrically bisected at the outward tip thereof by a transverse slot 186 which extends inward toward the solenoid 180 for a predetermined distance along the longitudinal axis of the plunger 182. Plunger 182 additionally includes a circumferential groove 188 extending around the periphery at the outward tip thereof, the purpose of which will become readily apparent from the following discussion.

Relative positioning of the interceptor pin 154 within the locus of travel of longitudinal cam member 136 is provided by virtue of the interceptor pivot arm's 150 pivotal connection with respect to the longitudinal center axis of the solenoid plunger 182. More specifically, the interceptor pivot arm 150 includes a centrally cutaway portion as shown generally at 160 across which is affixed a longitudinal pin member 162 which overlaps the edges of the cutaway portion so as to extend outwardly from the face of the interceptor pivot pin 150. Thus the interceptor pivot arm 150 is slid over a portion of the solenoid plunger 182 so that the plunger 182 extends through the centrally cutaway portion 160 of the interceptor pivot arm 150. The transverse slot 186 at the outward tip of the plunger also engages the longitudinal pin member 162 thus affixing the interceptor pivot arm 150 for rotation with the solenoid plunger 182 about the longitudinal axis thereof.

The interceptor pivot arm 150 is restrained from forward withdrawal from the solenoid plunger 182 by the connection of the follower pivot arm 152 to the plunger 182 in the following manner. The follower pivot arm 152 is longitudinally slotted as shown generally at 190 such that the opposed edges of the longitudinal slot remain torsionally biased toward each other. The longitudinal slot 190 includes opposed arcuate portions 192, 194 which are also slid over the solenoid plunger 182 into biasing engagement with the circumferential groove 188. In this manner, the follower pivot arm 152 is restrained from movement along the longitudinal axis of the solenoid plunger 182 while at the same time being accommodated for rotational movement thereof about the plunger 182. The follower pivot arm 152 additionally engages the longitudinal pin member 162 so as to prevent withdrawal thereof from the transverse slot 186.

There is additionally provided an upstanding stud member 163 which is threadably engaged through a tapped bore 164 in the interceptor pivot arm 150 so as to extend therethrough into engaging relation with the solenoid bracket 184 upon energization of the solenoid plunger 182. The interceptor pin 154 and its associated interceptor pivot arm 150 are operatively coupled to the pivot arm 152 by means of an integral flange portion 170 extending laterally outward from the side of the interceptor pivot arm 150 into engagement with a coincident edge portion of the follower pivot arm 152. The flange portion 170 operates in combination with a tension spring 190 interconnecting the interceptor and the follower pivot arms. One end of the tension spring 198 connects to an integral arm portion 200 of the follower pivot arm 152 with the other end of the tension spring being connected to an integral arm portion 202 from the interceptor pivot arm 150 in this manner continuously biasing the flange portion 170 into engagement with the coincident edge portion of the follower pivot arm 152. In this manner rotation of the focus wheel 124 is imparted to the follower pin 156 by virtue of its engagement within the face groove cam 158. Movement of the follower pin 156, in turn, operates to rotate the follower pivot arm 152 in correspondence with the interceptor pivot arm 150 about the longitudinal axis of the solenoid plunger 182.

It should be readily appreciated that the interceptor pivot arm 150 and the follower pivot arm 152 are rotated in concert with each other by the follower pin 156 as a direct result of the cooperative arrangement between the flange portion 170 and tension spring 198 and not as a result of their mutual connection to the solenoid plunger 182.

Figure 6:
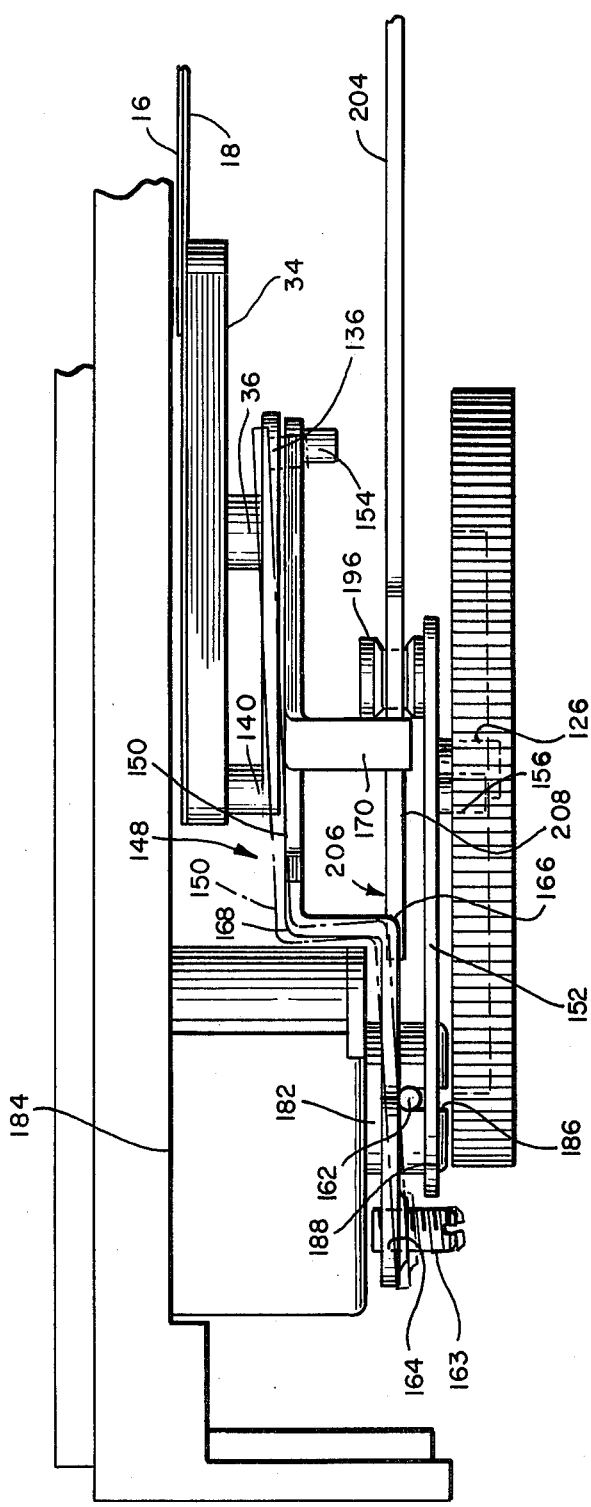
FIG. 6 is a sectional view taken across the lines 6—6 of FIG. 3.

Actuation of the follow focus interceptor as previously discussed is provided by select energization of the solenoid 180. When solenoid 180 is energized, its plunger 182 is retracted internally so as to cause the follower pivot arm 152 to also retract in correspondence therewith. The retracting follower pivot arm 152 in turn engages the longitudinal pin member 162 so as to also retract the interceptor pivot arm 150. The interceptor pivot arm 150 thus retracts inwardly until the upstanding stud member 163 engages the face of the solenoid bracket 184 at which point further retraction of the solenoid plunger causes the interceptor pivot arm 150 to rotate inwardly about the point of engagement between the upstanding stud 163 and the solenoid bracket 184. In this manner, the interceptor pivot arm 150 operates to move the interceptor pin 154 transversely into the predetermined locus of travel of the walking beam cam member 136 so as to restrain movement of the walking beam 34 together with its associated shutter aperture blades 16 and 18 at the determined maximum aperture size defining position as best seen in FIG. 6.

It should be readily appreciated that the above described arrangement permits a relatively limited retraction of the solenoid plunger 182 to be magnified into a substantially greater transverse motion of the interceptor pin 154. This magnified transverse motion of the interceptor pin 154 results from the fact that not only is the interceptor pin 154 translated in correspondence with the solenoid plunger 182, but also that the interceptor pin 154 is additionally translated as a result of the interceptor pivot arm 150 being rotated about the point of engagement between the upstanding stud member 163 and the solenoid bracket 184. It will be further appreciated that the follower pin 156 is translated in direct correspondence with the solenoid plunger 182 and thus undergoes only a limited translational movement so as to remain continuously engaged within the focus wheel face groove cam 158. De-energization of the solenoid 180 permits the spring loaded plunger 182 to move outwardly of the solenoid 180 into its original position, thus permitting the interceptor pivot arm 150 and its associated interceptor pin 154 to rotate outwardly about the upstanding stud 163 out of the locus of travel of the longitudinal cam member 136.

Once the solenoid 180 is actuated to move the interceptor pin 154 into the locus of travel of the longitudinal cam member 136, it will be appreciated that the determined maximum aperture size defining position of the shutter blades 16 and 18 will be selected as a direct result of the adjustment of the focus wheel 124 for which adjustment correlates to the distance from the objective lens to the scene being photographed. A predetermined number of degrees rotation for the interceptor pin 154 about the longitudinal center axis of the solenoid plunger 182 is specifically made to correspond to a predetermined number of aperture stop changes in the determined maximum aperture stop size. Thus, whereas the interceptor pin 154 is coupled to rotate in correspondence with the follower pin 156 during movement of the focus wheel 124, it will be further appreciated that a predetermined number of degrees of rotation of the follower pin 156 about the solenoid plunger 182 longitudinal axis will not necessarily correspond to a predetermined number of degrees rotation of the focus wheel 124. However, the face groove cam 158 will be configured to rotate the follower pin 156 and its associated interceptor pin 154 in direct correspondence with objective lens focusing in a manner so as to increase the determined maximum aperture size in proportion to the increase in distance from the objective lens 22 to the scene being photographed. As previously discussed, the square of the distance from the camera to the subject varies inversely with the light energy available at the subject from a given source. In this manner, the determined maximum aperture size is varied in correspondence with the amount of illumination anticipated at a subject scene from a given source of light.

Referring now to FIGS. 1–4, the components of the exposure mechanism providing a trim function for the follow focus aperture control are illustrated. Trim information from trim wheel 72 is mechanically transmitted to the interceptor assembly 148 through a trim link 204, one end of which defines an integral wedge portion 206 comprising opposed diverging edge wall sections 208 and 210. The opposed end of the trim link includes an opening as shown at 212 for pivotal receipt of an integral pin member 214 extending laterally outward from the backside of the trim wheel 72. The wedged portion of the trim link 204 extends between the interceptor pivot arm 150 and the follower pivot arm 152 in a manner such that the edge wall section 208 engages the laterally extending flange portion 170 while the other diverging edge wall section 210 engages a pin member 196 extending laterally outward from the back face of the follower pivot arm 152. The outward tip of the pin member 196 engages the forward face of the interceptor pivot arm 150 so as to maintain a predetermined spaced relationship between the interceptor pivot arm 150 and the follower pivot arm 152.

As is readily apparent from FIG. 6, in the preferred mode, the interceptor pivot arm 150 includes two right angle folds as shown generally at 166 and 168 which folds cooperatively operate to recess the interceptor pin 154 with respect to the outward tip of the solenoid plunger 182. The recess defined by the two right angle folds 166 and 168 also operates to increase the spacing between the interceptor pivot arm 150 and the follower pivot arm 152 so as to better accommodate insertion of the wedged portion 206 of trim link 204 therebetween.

As trim wheel 72 is manually pivoted to provide trim adjustment, pivot pin 214 is correspondingly moved about an arcuate locus of travel which varies horizontally. Such movement of pin 214, in turn, imparts a translational movement to trim link 204 which movement is witnessed at the trim link wedge portion 206. Translational movement of the wedged portion of the trim link in turn operates to rotate the interceptor pin 154 and its associated interceptor pivot arm 150 together with the solenoid plunger 182 to which the interceptor arm 150 is keyed by virtue of the cooperative arrangement between the longidutinal pin member 162 and the transverse slot 186. The follower pivot arm 152 remains locked in place during the trim adjustment as a result of its connection to the solenoid plunger 182 together with its connection to the face groove cam 158 through the follower pin 156. Thus, as is readily apparent, rotation of the interceptor pivot arm 150 in concert with rotation of the solenoid plunger 182 is response to trim link 204 translation must be accommodated by a circumferentially slidable connection between the solenoid plunger 182 and the follower pivot arm 152. Thus this connection is made sufficiently loose to permit pivotal movement of the follower pivot arm 152 around the circumferential groove 188. As is readily apparent, rotational movement is imparted to the interceptor pivot arm 150 by virtue of the engaging contact between the diverging edge wall section 208 and the flange portion 170 in cooperation with the engaging contact between the diverging edge wall section 210 and the pin member 196. During trim link 204 translation, pin member 196 remains stationary by virtue of its connection to the follower pivot arm 152 as previously described. Thus, the progressively varying distance between the diverging edge wall sections 208 and 210 determine the relative spacing between the flange portion 170 and the pin member 196 in a manner operating to rotate the interceptor pivot arm 150 with respect to the follower pivot arm 152. Therefore, the interceptor pin 154 may be selectively advanced or retarfed in its determined maximum aperture size-defining position by any select exposure value through a simple manipulation of the trim wheel 72.

An important aspect of this adjustment resides in the feature that any movement of the trim wheel 72 through a predetermined number of degrees can be made to effect the corresponding rotation of the interceptor pin 154 and its associated interceptor pivot arm 150 by another predetermined number of degrees corresponding to a predetermined number of aperture stop changes in the determined maximum aperture size. As is now readily apparent, this trim adjustment is entirely independent of the follow focus setting and does not depend upon moving the follower pin 156 by a predetermined distance along the face groove cam 158 as was the situation in heretofore described follow focus systems. It should additionally be appreciated that the trim link 204 is arranged to move in correspondence with rotation of the cam follower interceptor assembly 148 upon focus wheel 124 adjustment while all the time maintaining a substantially uniform arcuate spacing between the interceptor pivot arm 150 and the follower pivot arm 152. Therefore, a predetermined number of degrees rotation imparted to the follower pivot arm 152 will be reflected by substantially the same number of degrees rotation of the interceptor pivot arm 150.

Referring specifically to FIG. 3, there is shown the trim position assumed when the determined maximum aperture size is decreased in order to darken the exposure. As is readily apparent, the trim wheel 72 is rotated in a counterclockwise direction to impart a translational motion to the trim link 204 which slides integral wedge portion 206 in the direction of increasing distance between the respective points of engagement of the edge wall sections 208 and 210 with the cam follower interceptor assembly 148. In this manner, the interceptor pin 154 together with its associated interceptor pivot arm 150 are rotated in a counterclockwise direction by a predetermined number of degrees corresponding to a predetermined number of F/stop changes in the determined maximum aperture size.

Conversely, there is shown in FIG. 4 the trim position assumed when the determined maximum aperture size is increased in order to lighten the exposure. Again as is readily apparent, the trim wheel 72 is rotated in a clockwise direction so as to impart translational movement to the trim link 204 at a direction operating to decrease the distance between the respective points of engagement of the diverging edge wall sections 208 and 210 with the cam follower interceptor assembly 148. Thus, the interceptor pin 154 and its associated interceptor pivot arm 150 are rotated by a predetermined number of degrees in a clockwise direction so as to change the determined maximum aperture size by a predetermined number of F/stops.

In a preferred arrangement of the above-described invention, a full rotation of the trim wheel 72 from the neutral position in FIG. 1 will result in either a plus or a minus one and one-half ($\pm 1\frac{1}{2}$) F/stop change in the maximum aperture sizes determined by the follow focus aperture setting.

As previously described, rotation of trim wheel 72 also serves to selectively position an optical wedge 70 over the light sensing element of an exposure control system. As a consequence, any exposure value inserted as a trim from trim wheel 72 is simultaneously inserted into the follow focus control system as well as into the ambient exposure control system. This arrangement is advantageous where the trim is inserted to accommodate for minor speed variations occasioned in the manufacture of the film being used with the photographic apparatus. It should additionally be appreciated that the cam follower interceptor assembly 148 together with the trim link 204 may be formed as relatively thin stampings which are capable of closely nesting in juxtaposition to the internal face of the focus wheel 124. As such, these components require a minimum of front-to-back packaging volume.

Since certain changes may be made in the above described system and apparatus without departing from the scope of the invention herein involved, it is intended that all matter contained in the description thereof or shown in the accompanying drawings shall be interpreted as illustrative and not in a limiting sense.

I claim as my invention:

1. Apparatus for a camera of the type defining a film plane and including a housing and an objective lens mounted on the housing, said apparatus comprising:

means for adjusting the objective lens to accommodate its focusing at the camera's plane of images of scenes located at different distances from the camera;

means for controlling the amount of scene light incident on the film plane, said scene light controlling means including a blade assembly movable along a predetermined path to define a range of apertures through which scene light must pass in reaching the film plane;

means responsive to the operation of said adjusting means for determining a maximum aperture size from said range of aperture sizes whereby said determined maximum aperture size corresponds to the distance a particular scene being photographed is positioned from the camera, said maximum aperture size determining means including a cam surface coupled to said lens adjusting means to be displaced in correspondence with the operation of said lens adjusting means, a cam follower in contact with said cam surface, an interceptor operable to restrain the movement of said blade assembly along said predetermined path and means for coupling said cam follower to said interceptor wherein said coupling means are disposed for rotation about a select pivot point spaced apart from said scene light controlling means, said pivot point being maintained in fixed relation with respect to the objective lens such that displacement of said cam surface in correspondence with objective lens focusing operates to effect a displacement of said cam follower in a manner resulting in rotation of said coupling means and its associated interceptor about said select pivot point thus changing said determined maximum aperture size.

2. The apparatus of claim 1 wherein the rotation of the interceptor and its associated coupling means about said select pivot point by a predetermined number of degrees substantially corresponds to a predetermined number of aperture stop changes in said determined maximum aperture size regardless of where the objective lens is focused by said adjusting means.

3. The apparatus of claim 1 including drive means selectively operable for moving said coupling means interceptor into the predetermined path of said blade assembly to restrain the movement of said blade assembly at said determined maximum aperture size defining position.

4. The apparatus of claim 3 wherein said drive means includes a device maintained in fixed relation with respect to the camera housing and including a selectively retractable plunger member extending outward therefrom along a center axis coincident with said select pivot point, said coupling means connecting directly to said plunger member and extending laterally outward therefrom so as to be rotatable about said plunger member center axis while at the same time being selectively movable in correspondence with said plunger member retraction in a manner operating to move said interceptor transversely into the predetermined path of said blade assembly to restrain the movement of said blade assembly at said determined maximum aperture size defining position.

5. The apparatus of claim 4 where in said coupling means includes: a first pivot arm portion extending laterally outward from said plunger member into connection with said interceptor, a second pivot arm portion spaced apart from said pivot arm portion and extending laterally outward from said plunger member into connectioon with said cam follower, and means for connecting said first and second pivot arm portions for rotation in correspondence with each other upon cam follower displacement; said apparatus additionally including means for spacing said first and second pivot arm portions apart along the longitudinal length of said plunger member together with means for limiting retraction of said first pivot arm portion at a location on said first pivot arm portion spaced laterally apart from said plunger member whereby said plunger member retraction into said solenoid operates to cause said second pivot arm portion to retract and engage said spacing means, in turn retracting said spacing means in engagement with said first pivot arm portion so as to ultimately rotate said first pivot arm portion about its location of limited retraction in a manner operating to move said interceptor transversely into the predetermined path of said blade assembly to restrain the movement of said blade assembly at said determined maximum aperture defining position.

6. The apparatus of claim 5 wherein: the plunger member is diametrically bisected at the outward tip thereof by a transverse slot; the first pivot arm portion includes a centrally cutaway portion through which the plunger member extends; the spacing means comprises a longitudial pin member extending across said first pivot arm cutaway portion in a manner overlapping the edges of said cutaway portion so as to extend outwardly of said first pivot arm portion into engagement with said second pivot arm portion, said pin member additionally being keyed to said transverse slot at the outward tip of said plunger member; and said retraction limiting means includes an upstanding stud extending laterally outward from said first pivot arm portion from a location on said first pivot arm ortion spaced apart from said plunger member.

7. The apparatus of claim 5 wherein said connecting means between said first and second pivot arm portions comprises an arm member extending laterally outward from one of said pivot arm portions into engagement with an edge portion of the other of said pivot arm portions in combination with a resilient biasing means interconnecting said first and second pivot arm portions for continuously urging said arm member into engagement with the edge portion of the other of said pivot arm portions.

8. The apparatus of claim 5 wherein said blade assembly includes: two blade elements having respective apertures therethrough wherein said apertures may be simultaneously moved over the objective lns to define said range of apertures, means for interconnecting said blade elemetns for movement in correspondence with each other; and a second cam surface connecting said blade element connecting means for movement in correspondence therewith thru said predetermined path wherein said interceptor includes a pin member selectively movable into said predetermined path for restraining engagement with said second cam surface to define said determined maximum aperture size.

9. Apparatus for a camera of the type defining a film plane and including a housing and an objective lens mounted on the housing, said apparatus comprising:
means for adjusting the objective lens to accommodate its focusing at the camera's film plane of images of scenes located at different distances from the camera;
means for controlling the amount of scene light incident on the film plane, said scene light controlling means including a blade assembly movable along a predetermined path to define a range of apertures through which scene light must pass in reaching the film plane;
means responsive to the operation of said adjusting means for determining a maximum aperture size from said range of aperture sizes whereby said determined maximum aperture size corresponds to the distance a particular scene being photographed is positioned from the camera, said maximum aperture size determining means including: a cam surface coupled to said lens adjusting means to be displaced in correspondence with the operation of said lens adjusting means, a cam follower in contact with said cam surface, an interceptor operable to restrain the movement of said blade assembly along said predetermined path and means for coupling said cam follower to said interceptor wherein said coupling means is disposed for rotation about a select pivot point spaced apart from said scene light controlling means; said pivot point being maintained in fixed relation with respect to the objective lens such that displacement of said cam surface in correspondence with objective lens focusing operates to effect a displacement of said cam follower in a manner resulting in rotation of said coupling means and its associated interceptor about said select pivot point thus changing said determined maximum aperture size;

drive means selectively operable for moving said coupling means interceptor into the predetermined path of said blade assembly to restrain the movement of said blade assembly at said determined maximum aperture size defining position; and means for selectively trimming the determined maximum sized aperture defining position of said interceptor by pivoting said interceptor about said select pivot point in a manner imposing an arcuate displacement to said interceptor independent of the operation of said adjusting means and solely dependent upon the operation of said trimming means.

10. The apparatus of claim 9 wherein the rotation of said interceptor about said select pivot point by a predetermined number of degrees substantially corresponds to a predetermined number of aperture stop changes in said determined maximum aperture sized regardless of where the objective lens is focused by said adjusting means.

11. The apparatus of claim 10 wherein said trim means includes a trim link having a wedged section comprising opposed diverging edgewall portions; and wherein said coupling means includes: a first pivot arm portion extending laterally outward from said select pivot point into connection with said interceptor, a second pivot arm portion spaced apart from said first pivot arm portion and extending laterally outward from said select pivot point into connection with said cam follower, and means for connecting said first and second pivot arm portions for rotation in correspondence with each other upon cam follower displacement in contact with objective lens focusing in a manner whereby said connecting means are continuously engaged by the wedged section of said trim link such that selective displacement of said trim link along the longitudinal axis of said trim link wedged section operates to rotate said first pivot arm portion and its associated interceptor about said select pivot point so as to trim the determined maximum sized aperture defining position of said interceptor during which time said second pivot arm portion and its associated follower remain in fixed position.

12. The apparatus of claim 11 wherein said drive means includes a device maintained in fixed relation with respect to the camera housing and including a selectively retractable plunger member extending therefrom along a center axis coincident with said select pivot point, said first and second pivot arm portions connecting directly to said plunger member and extending laterally therefrom so as to be rotatable about said plunger member center axis while at the same time being selectively movable in correspondence with said plunger member retraction in a manner operating to move said interceptor transversely into the predetermined path of said blade assembly to restrain the movement of said blade assembly at said determined maximum aperture size defining position.

13. The apparatus of claim 12 additionally including means for spacing said first and second pivot arm portions apart along the longitudinal length of said plunger member together with means for limiting retraction of said first pivot arm portion at a location on said first pivot arm portion spaced laterally apart from said plunger member whereby said plunger member retraction into said solenoid operates to cause said second pivot arm portion to retract and engage said spacing means, in turn retracting said spacing means in engagement with said first pivot arm portion so as to ultimately rotate said second pivot arm portion about its location of limited retraction in a manner operating to move said interceptor transversely into the predetermined path of said blade assembly to restrain the movement of said blade assembly at said determined maximum aperture defining position.

14. The apparatus of claim 13 wherein: the plunger member is diametrically bisected at the outward tip thereof by a transverse slot; the first pivot arm portion includes a centrally cutaway portion through which the plunger member extends; the spacing means comprises a longitudinal pin member extending across said first pivot arm cutaway portion in a manner overlapping the edges of said cutaway portion so as to extend outwardly of said first pivot arm portion into engagement with said second pivot arm portion, said pin member additionally being engaged by said transverse slot at the outward tip of said plunger member, and said retraction limiting means includes an upstanding stud extending laterally outward from said first pivot arm portion from a location on said first pivot arm portion spaced apart from said plunger member.

15. The apparatus of claim 13 wherein said blade assembly includes: two blade elements having respective apertures therethrough wherein said apertures may be simultaneously moved over the objective lens to define said range of apertures, means for interconnecting said blade elements for movement in correspondence with each other; and a second cam surface connecting said blade element connecting means for movement in correspondence therewith thru said predetermined path wherein said interceptor includes a pin member selectively movable into said predetermined path for restraining engagement with said second cam surface to define said determined maximum aperture size.

16. The apparatus of claim 13 wherein said connecting means between said first and second pivot arm portions comprises a first arm member extending laterally outward from said first pivot arm portion into engagement with an edge portion of said second pivot arm portion together with a second arm member extending laterally outward of said second pivot arm portion into sliding engagement with the face of said first pivot arm portion in combination with a resilient biasing means interconnecting said first and second pivot arm portions for continuously urging said first arm member into engagement with the edge portion of said first pivot arm portion; and wherein the wedge section of said trim link extends between said first and second arm members in a manner whereby said first and second arm members are urged into continuous engagement with respective diverging edgewall portions such that displacement of said trim link along the longitudinal axis thereof operates to vary the distance between said first and second arm members thus rotating said second pivot arm portion and its associated interceptor about said select pivot point with said second pivot arm portion being locked in position by virtue of said cam follower being contacted by said cam surface.

17. The apparatus of claim 16 wherein said trim means includes a trim wheel in rotatable connection with respect to the camera housing, said trim wheel including a pin member extending laterally from one side thereof into rotatable connection with said trim link such that selective rotation of said trim wheel operates to rotate said pin member thru a predetermined arcuate path in turn displacing said trim link in a manner whereby the wedged section of said trim link is displaced along its longitudinal axis.

18. Apparatus for a camera of the type defining a film plane and including a housing and an objective lens mounted on the housing, said apparatus comprising:
  means for adusting the objective lens to accommodate its focusing a the camera's film plane of images of scenes located at different distances from the camera;
  means for controlling the amount of scene light incident on the film plane, said scene light controlling means including a blade assembly movable along a predetermined path to define a range of apertures through which scene light must pass in reaching the film plane;
  means responsive to the operation of said adjusting emans for determining a maximum aperture size from said range of aperture sizes whereby said determined maximum aperture size corresponds to the distance a particular scene being photographed is positioned from the camera, said maximum aperture size determining means including: a cam surface coupled to said lens adjusting means to be displaced in correspondence with the operation of said lens adjusting means, a cam follower in contact with said cam surface, an interceptor operable to restrain the movement of said blade assembly along said pre-determined path and means for coupling said cam follower to said interceptor wherein said coupling means is disposed for rotation about a select pivot point spaced apart from said scene light controlling means; said pivot point being maintained in fixed relation with respect to the objective lens such that displacement of said cam surface in correspondence with objective lens focusing operates to effect a displacement of said cam follower in a manner resulting in rotation of said coupling means and its associated interceptor about said select pivot point thus changing said determined maximum aperture size; and
  means for selectively trimming the determined maximum sized aperture defining position of said interceptor by displacing said interceptor in a manner whereby said cam follower remains substantially unmoved along said cam surface thus making the displacement of said interceptor independent of the operation of said adjusting means as well as the position of said cam surface and solely dependent upon the operation of said trimming means.

19. The apparatus of claim 18 wherein said trim means includes a trim link having a wedged section comprising opposed diverging edgewall portions; and wherein said coupling means includes: a first pivot arm portion extending laterally outward from said select pivot point into connection with said interceptor, a second pivot arm portion spaced apart from said first pivot arm portion and extending laterally outward from said select pivot point into connection with said cam follower, and means for connecting said first and second pivot arm portions for rotation in correspondence with each other upon cam follower displacement in contact with objective lens focusing in a manner whereby said connecting means are continuously engaged by the wedged section of said trim link such that selective displacement of said trim link along the longitudinal axis of said trim link wedged section operates to rotate said first pivot arm portion and its associated interceptor about said select pivot point so as to trim the determined maximum sized aperture defining position of said interceptor during which time said second pivot arm portion and its associated follower remain in fixed position.

20. The apparatus of claim 19 including drive means selectively operable for moving said coupling means interceptor into the predetermined path of said blade assembly to restrain the movement of said blade assembly at said determined maximum aperture size defining position wherein said drive means includes a device maintained in fixed relation with respect to the camera housing and including a selectively retractable plunger member extending therefrom along a center axis coincident with said select pivot point, said first and second pivot arm portions connecting directly to said plunger member and extending laterally therefrom so as to be rotatable about said plunger member center axis while at the same time being selectively movable in corrrespondence with said plunger member retraction in a manner operating to move said interceptor transversely into the predetermined path of said blade assembly to restrain the movement of said blade assembly at said determined maximum aperture size defining position.

* * * * *